(12) United States Patent
Lundberg

(10) Patent No.: US 11,564,409 B2
(45) Date of Patent: Jan. 31, 2023

(54) HIGHLY REFINED CELLULOSE CARRIER FOR OIL FLAVORANTS

(71) Applicant: Brock M. Lundberg, Osseo, WI (US)

(72) Inventor: Brock M. Lundberg, Osseo, WI (US)

( * ) Notice: Subject to any disclaimer, the term of this patent is extended or adjusted under 35 U.S.C. 154(b) by 106 days.

(21) Appl. No.: 16/739,314

(22) Filed: Jan. 10, 2020

(65) Prior Publication Data

US 2020/0146323 A1    May 14, 2020

Related U.S. Application Data

(63) Continuation-in-part of application No. 15/411,974, filed on Jan. 21, 2017, now abandoned.

(51) Int. Cl.
| | | |
|---|---|---|
| *A23L 27/00* | (2016.01) | |
| *A23L 27/12* | (2016.01) | |
| *A23L 33/24* | (2016.01) | |
| *A23L 29/262* | (2016.01) | |
| *A23P 20/10* | (2016.01) | |

(52) U.S. Cl.
CPC .............. *A23L 27/75* (2016.08); *A23L 27/12* (2016.08); *A23L 33/24* (2016.08); *A23P 20/105* (2016.08); *A23V 2002/00* (2013.01)

(58) Field of Classification Search
None
See application file for complete search history.

(56) References Cited

U.S. PATENT DOCUMENTS

2011/0020525 A1* 1/2011 Homsma ............... A23L 33/17
 426/616
2011/0293814 A1* 12/2011 Alexandre ............ A23L 19/07
 426/577

FOREIGN PATENT DOCUMENTS

WO    WO-2009075851 A1 *  6/2009  ............... A23G 9/42

OTHER PUBLICATIONS

"What is Citri-Fi?" Fiberstar Inc. (2013). (Year: 2013).*

* cited by examiner

*Primary Examiner* — Bethany P Barham
*Assistant Examiner* — Peter Anthopolos
(74) *Attorney, Agent, or Firm* — Mark A. Latman & Associates, P.A.

(57) ABSTRACT

A composition of matter is used as an ingredient in consumable products (for humans and pets) comprising at least 0.005% by weight and preferably 1-30% by weight of highly refined cellulose fiber having at least 15% by total weight of the highly refined cellulose material of an oil-based flavoring or aroma-producing material, the composition of matter being provided as a free-flowing, dry-feel particulate material having a number average mean particle size of less than 2 mm.

16 Claims, 2 Drawing Sheets

Figure 2. Sensory analysis of powders through touch, 1: Free Flowing Powder, 10: Cohesive Powder. Samples were plated with oil at the indicated levels.

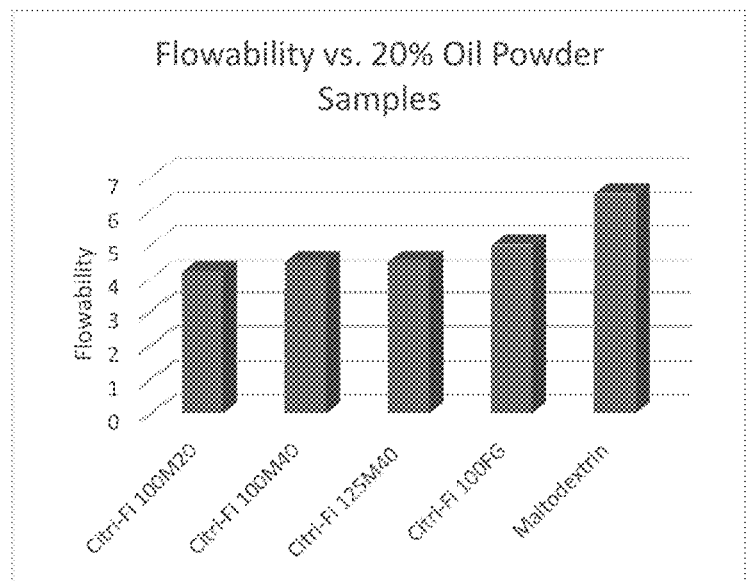
Figure 3: Flowability of all carriers plated at 20% oil loading levels.
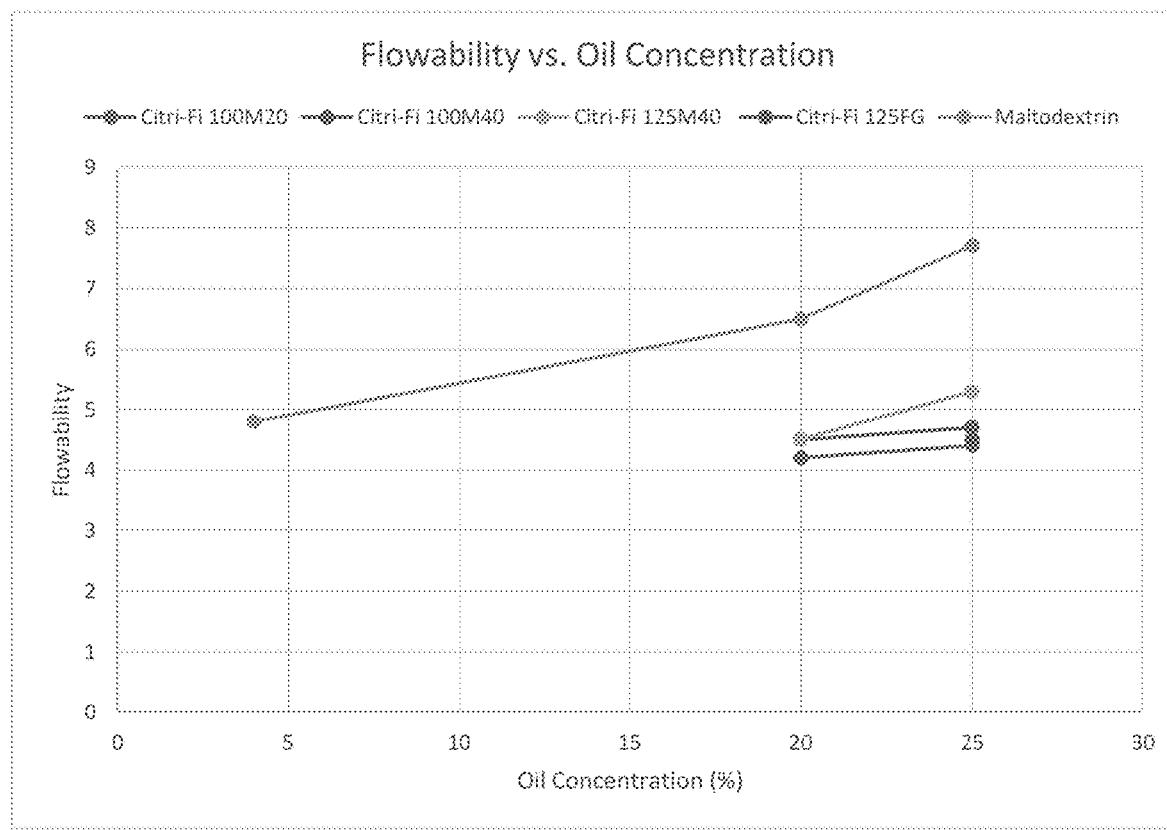
Figure 4. Sensory analysis of powders through touch, 1: Free Flowing Powder, 10: Cohesive Powder.

HIGHLY REFINED CELLULOSE CARRIER FOR OIL FLAVORANTS

RELATED APPLICATIONS DATA

This application claims priority under 35 U.S.C. 120 as a Continuation-in-Part from U.S. patent application Ser. No. 15/411,974, filed 21 Jan. 2017, which in turn claims priority from U.S. Provisional Patent Application Ser. No. 62/293,853, filed 11 Feb. 2016 titled "HIGHLY REFINED CELLULOSE CARRIER FOR OIL FLAVORANTS" and this application is a continuation-in-part of U.S. patent application Ser. No. 12/459,452, filed 30 Jun. 2009, titled "STABILIZATION OF COSMETIC COMPOSITIONS." These applications are related to additional U.S. patent applications which are not yet claimed for their priority under 35 USC 120, but which are incorporated by reference in their entirety, including U.S. patent application Ser. No. 11/440,603 (filed May 25, 2006) and Ser. No. 10/969,805 (filed 20 Oct. 2004), and titled "HIGHLY REFINED CELLULOSIC MATERIALS COMBINED WITH HYDROCOLLOIDS," which are continuations-in-part of U.S. patent application Ser. No. 10/288,793, filed Nov. 6, 2002, titled "HIGHLY REFINED FIBER MASS, PROCESS OF THEIR MANUFACTURE AND PRODUCTS CONTAINING THE FIBERS." All documents cited are incorporated by reference in their entirety herein.

GOVERNMENT INTEREST

This invention was made with Government support under a Small Business Innovation Research (SBIR) grant awarded by the National Science Foundation. The Government has certain rights in this invention.

BACKGROUND OF THE INVENTION

1. Field of the Invention

The present invention relates to the field of carriers for organic oils, particularly essential oils and flavoring, actives, or scented oil to for edible products, and especially as dry, flowable particles of highly refined cellulose particles carrying those oils with a dry feel that can be used in edible products.

2. Background of the Art

The use of flavoring, actives, or aroma-providing materials into products, especially food products is commonly done to enhance the pleasure, improve quality, extend shelf-life, and increase purchases of goods, especially foods and beverages. From the basic use of salt, spices, herbs and the like in early times, to the more sophisticated additives produced in bulk today, such additives have always been important.

Published U.S. Patent Application Document No. 20130266708 (Shigemura), which is a continuation to U.S. Pat. No. 8,148,536, discloses the use of certain high potency savory ('umami') taste modifiers, as savory flavoring agents and/or enhancers of monosodium glutamate, for the preparation of foods, beverages, and other comestible compositions, and to processes for preparing food flavorant compositions for use in the preparation of comestible food and drink. The flavorant solution is then contacted with one or more comestibly acceptable solid carriers or a solution, dispersion, or emulsion thereof, to form an intermediate composition that can be optionally processed further to insure uniform distribution of the Umami compounds in the intermediate composition. Suitable solid carriers including edible polysaccharides such as natural or modified starches, vegetable flours, maltodextrin, gelatin type A, gelatin type B, polyphosphate, alginate, chitosan, carrageenan, pectin, starch, gum arabic, alfa-lactalbumin, beta-lactoglobumin, ovalbumin, polysorbitol, cyclodextrin, cellulose, methyl cellulose, ethyl cellulose, hydropropylmethylcellulose, carboxymethylcellulose, powdered milk, milk protein, whey protein, soy protein, canola protein, albumin, kosher gelatin, non-kosher gelatin, Halal gelatin, and non-Halal gelatin.

Published U.S. Patent Application Document No. 201202888598 (Leusner) relates to a method of fortifying a processed cereal piece with external fiber comprising: providing said processed cereal piece; using coating means, accritively coating said processed cereal piece with between 5.0% and about 50% w/w of the coated cereal piece with said fiber, wherein the step of coating comprise adding said processed cereal pieces into a coating means; separately adding fiber and an adhesive liquid to said coating means; and accritively increasing fiber content on the surface of the processed cereal piece in the coating means, wherein 30 grams of the coated processed cereal piece have less than or equal to 100 calories and shows substantially no clouding in 250 ml. cold water after 10 seconds.

Published U.S. Patent Application Document No. 20130216651 (Bennedb,ae) relates to a process for producing a baked product having increased flavor stability comprising the steps of: (a) preparing a dough comprising flour, water, an enzyme preparation having catalase activity and an enzyme preparation having phospholipase activity; and (b) baking the dough to obtain the baked product.

Published U.S. Patent Application Document No. 20100055264 (Liniger) describes a method of imparting flavor to an edible substrate by precision depositing a first food grade flavored wax onto a surface of an edible substrate. A method of providing a flavored image on an edible substrate by ink jet printing a food grade colored fluid on an edible substrate to create an image and applying a food grade flavored wax onto the edible substrate. A method of imparting flavor to an edible substrate by applying a food grade flavored wax onto the edible substrate and applying a food grade flavored fluid onto the edible substrate.

Improved methods and compositions for imparting stable and durable flavors and aromas to goods are needed, especially where the durability and stability of the flavor and aroma is needed.

SUMMARY OF THE INVENTION

A composition of matter is used as an ingredient in consumable products (for humans and pets) comprising at least 0.005% by weight and preferably 1-30% by weight of highly refined cellulose fiber having at least 15% by total weight of the highly refined cellulose material of an oil-based flavoring, active ingredient, or aroma-producing additive material, the composition of matter being provided as a free-flowing, dry-feel particulate material having a number average mean particle size of less than 2 mm. Dry-feel does not mean moisture-free, but relates to "feel", flowability, and allows as much as 20% by total weight of the composition as water, even as an emulsion with the oil. Additionally present in the composition may be other conventional flavoring compounds and aroma-providing compounds, preferably in the total absence of edible gums and maltodextrin. A composition of matter and method of making the composition comprising a free-flowing, dry-feel particulate material having a number average mean particle size of less than 2 mm useful as an edible product for mammals, the particulate material comprising:
a) a highly-refined cellulose material having an open and porous structure;
b) the highly refined cellulose material having an oil-based material adsorbed and absorbed on its open and porous structure;
c) the oil-based material present as adsorbed and/or absorbed material as at least 15% by total weight of the highly refined cellulose material;
d) the oil-based material being safely ingestible by mammals; and wherein the oil-based material is oxidized at least at a rate or as an absolute amount by weight of 5% less after 8 hours when adsorbed and/or absorbed by the highly refined cellulose than the oil-based material alone in air having a 21% by volume oxygen content, 50% relative humidity at 20° C. and 760 mm pressure.

BRIEF DESCRIPTION OF THE FIGURES

FIG. 2 shows a sensory analysis of powders through touch, 1: Free Flowing Powder, 10: Cohesive Powder. Samples were plated with oil at the indicated levels.

FIG. 3 shows a representation of flowability results for all carriers plated at 20% oil loading levels.

FIG. 4 shows a graphic representation of a sensory analysis of powders through touch, 1: Free Flowing Powder, 10: Cohesive Powder.

DETAILED DESCRIPTION OF THE INVENTION

Figure 1:
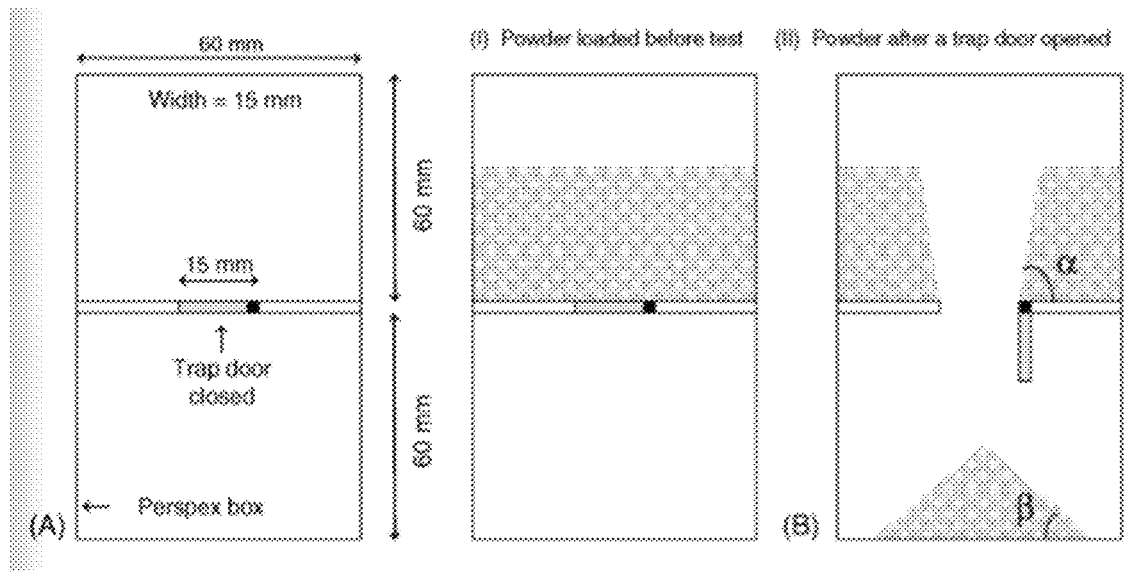
FIG. 1 shows a schematic representation of the flowability test equipment (A) and the flowability test (B). α: drained angle of repose and β: poured angle of repose.
Figure 1:
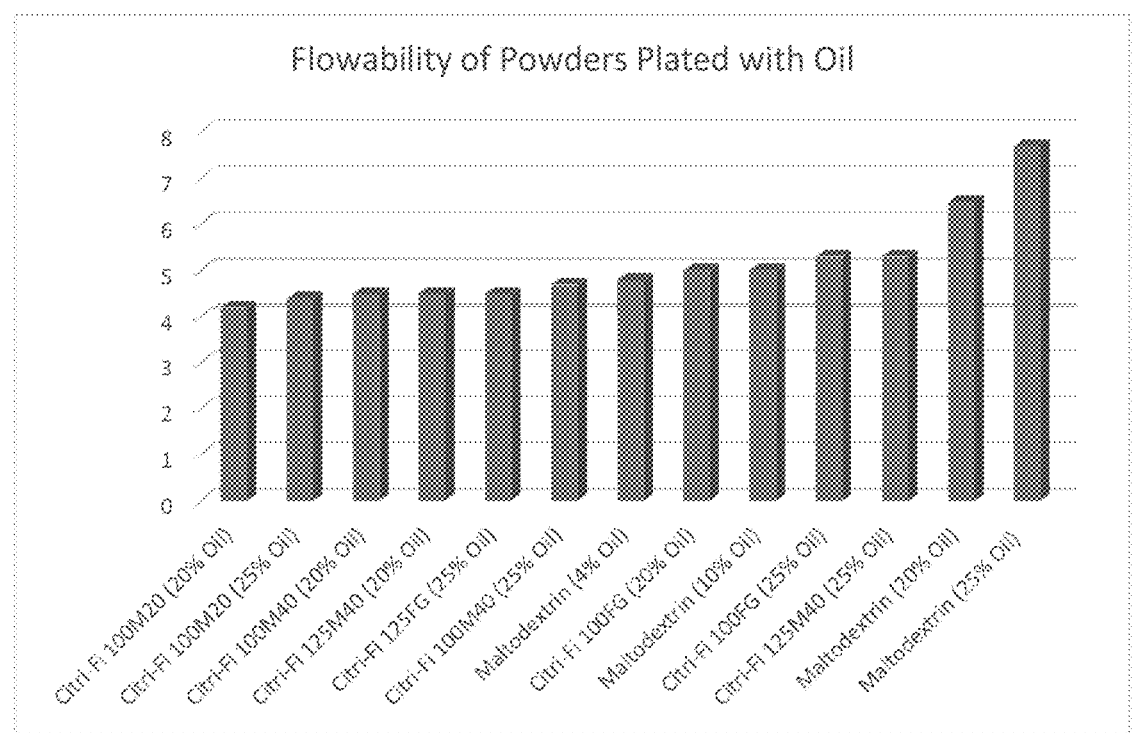

A composition of matter and method of making the composition having a free-flowing, dry-feel particulate material having a number average mean particle size of less than 2 mm useful as an edible product for mammals. Dry-feel does not mean moisture-free, but relates to "feel" and flowability, and allows as much as 20% by total weight of the composition as water. It is especially useful for human edible products. The particulate material includes:
a) a highly-refined cellulose material having an open and porous structure; These types of materials have been investigated by the Inventor in such Published US Patent Application Document Nos. such as: 2015029262; 20150024108; 20140363560; 20120142909; 20110268860; 20090274811; 20090269376; 20080193590; 20080266464; 20060210687; 20060204631; 20050274469; 20050271790, and others.
b) the highly refined cellulose material having an oil-based material adsorbed and absorbed on its open and porous structure; Oil flavorings are well known in the cooking and beverage arts, and can be provided by pressing or extraction from many materials. Common oil flavorings, actives, and aroma providing oils may include various mint oils (e.g., peppermint, spearmint), fruit extracts or oils (e.g., lemon, cherry, pineapple, lime, orange, olive, etc.), herb or spice extracts (cinnamon oil, Anise extract, ginger oil, nutmeg, paprika, clove, thyme, etc.), bean oils (e.g., almond, hazelnut, vanilla, coffee, etc.), and active oils (e.g. rosemary, coconut, pimento, tea, pomegranate oil, fish oil, etc) and any oil material, naturally or synthetically produced. Non-ingestible oils may also be provided, but not for human consumption.
c) the oil-based material present as adsorbed and/or absorbed material as at least 15% by total weight of the highly refined cellulose material; This is a significant minimal content requirement. The more common carriers for oil (e.g., maltodextrin, a polysaccharide commonly used as a food additive) are not able to carry more than about 5-10% by weight of oil, and then with an oily feel at the upper range of oil presence, or else (e.g., with silica) the carriers also have little retention strength and are non-digestible, impacting both animal digestive tract and the environment.
d) the oil-based material being safely ingestible by mammals (it does not have to be digestible, but must not harm the digestive tract as would toxic oils); and wherein the oil-based material is oxidized at a rate or as an absolute amount by weight of at least 5% less after 8 hours when adsorbed and/or absorbed by the highly refined cellulose than the oil-based material alone in air having a 21% by volume oxygen content, 50% relative humidity at 20° C. and 760 mm pressure. This is only one of a number of potential or actual advantages for the practice of the present technology. As noted above, the present highly refined carrier is able to support and carry larger amounts of oil based materials, and provide them in a manner where the release can be extended over time, rather than a rapid release, as would occur with polysaccharide carriers such as maltodextrin. Dry-feel does not mean moisture-free, but relates to "feel" and allows as much as 5%, 10% of 20% by total weight of the composition as water. It is especially useful for human edible products.

The composition may be used where the oil-based material consists essentially of an essential oil or oil derived from plant materials. The composition may be completely free of maltodextrin, surfactant, or bum material (e.g., guar gum, agar agar, etc.) present in the composition of matter. There may be instances when such materials may be present (in amounts equal to the highly refined cellulose fiber material), but not necessarily as a preferred embodiment.

The composition may have at least 50% by weight of the oil-based material (originally in the composition at a level of 20% by weight oil to refined cellulose fiber material) retained in an adsorbed or absorbed condition on the highly refined cellulose when the composition is dispersed in a non-ionic, aqueous composition in a concentration of 10% and held at 20° C. and 760 mm pressure for 30 minutes.

The composition (the combination of highly refined cellulose fiber material plus oil) may be blended in or coated on an uncooked food product in an amount of at least 0.005% but preferably less than 2% by total weight of the uncooked food product. Higher amounts may be used, but they would be less marketable to consumers. The composition may be blended into the ingredients before cooking, and/or sprinkled/dusted onto the ingredients before, during or after cooking.

One of a number of methods of making the compositions of the present technology includes providing a highly refined cellulose fiber material (e.g., having a total dietary fiber content greater than 30% as measured by AOAC 991.43 and a water holding capacity greater than five parts water per part fiber as measured by AACC 56-30 and is less than 90% soluble fiber), dry-blending the highly refined cellulose material with from 15% to 100% by weight of the oil-based material, mixing the highly refined cellulose fiber material with the oil based material to cause the oil based material to adsorb and absorb on the highly refined cellulose material in an amount of at least 15% by total weight of the highly refined cellulose material to form the composition with a dry feel to the composition when compressed by a pressure of 10 g/cm².

A parallel technology includes a composition of matter comprising a free-flowing, dry-feel particulate material having a number average mean particle size of less than 2 mm useful as an edible product for mammals, the particulate material comprising:
  a) a highly-refined cellulose material having an open and porous structure;
  b) the highly refined cellulose material having an oil-based material adsorbed and absorbed on its open and porous structure;
  c) the oil-based material may be present as adsorbed and/or absorbed material as at least 15% up to, but less than 50% by total weight of the highly refined cellulose material;
  d) the oil-based material being safely ingestible by mammals; and
wherein the oil-based material is oxidized at least 5% less after 8 hours when adsorbed and/or absorbed by the highly refined cellulose than the oil-based material alone in air having a 21% by volume oxygen content, 50% relative humidity at 20° C. and 760 mm pressure. The oil-based material is preferably present (absorbed or adsorbed) as from 15-45%, 15-40% and 20-40% by total weight of the highly refined cellulose material. With amounts of oil at 50%, whether adsorbed or absorbed (especially adsorbed), the material may tend to agglomerate of small amounts of particles may attach by merging of surface liquid. With absorbed materials, a maximum of 45% by weight is best, and with adsorbed materials (or a combination of absorption and adsorption, a 40% maximum weight is preferred. The composition is most preferred wherein the oil-based material consists essentially of an essential oil or oil derived from plants and the essential oil or oil derived from plants is present as from at least 15% up to 20% or 15%-25% by weight of the highly refined cellulose material. The composition may have the oil-based material consists essentially of an antimicrobial active oil or antioxidant oil. The composition may have no maltodextrin present in the composition of matter. The composition preferably has no surfactant present in the composition of matter, and where there is no gum material present in the composition of matter. The preferred composition has no maltodextrin, no surfactant, and no gum material present in the composition of matter, and the essential oil or oil derived from plants is present as from at least 15% up to 20% by weight of the highly refined cellulose material.

The method may be practiced where the oil based composition is present during dry-blending in an amount consisting of 15% to 40% by weight of the highly refined cellulose fiber material. The oil-based material may be sprayed, sprinkled or otherwise uniformly or grossly be deposited on the highly refined cellulose fiber material and then dry-blending is effected by active mechanical blending, stirring, shearing, tossing, with or without concurrent drying. The method may have the oil-based material consist essentially of an essential oil or oil derived from plants, with no maltodextrin present in the composition of matter, and no surfactant present in the composition of matter.

A highly refined cellulosic materials (e.g., cellulose, modified celluloses, derivatized celluloses, hemicellulose, lignin, etc.) provides desirable properties in edible compositions by themselves, but with the additional ability to provide controlled release and stable oil-bearing compositions, improving moisture retention, oil retention and absorbance, and product stability in both storage and in application of additives and edible compositions and cooked edible products. A preferred highly refined cellulose product can be prepared by generally moderate treatment and still provide properties that are equivalent to or improved upon the properties of the best highly refined cellulose products produced from more intense and environmentally unfriendly processes. Fruit or vegetable cells with an exclusively parenchymal cell wall structure can be treated with a generally mild process to form highly absorbent microfibers. Cells from citrus fruit and sugar beets are particularly available in large volumes to allow volume processing to generate highly refined cellulose fibers with both unique and improved properties.

These exclusively parenchymal microfibers (hereinafter referred to as EPM's) have improved moisture retention and thickening properties that enable the fibers to provide unique benefits when combined into edible materials.

A new process for making HRC cellulose from parenchyma cell wall products, e.g., citrus fruit and sugar beets by-products, is performed in the absence of a hydroxide soaking step. The product is able to display the same or improved water retention properties and physical properties of the more strenuously refined agricultural products of the prior art, and in some cases can provide even higher water retention values, thickening and other properties that can produce unique benefits in particular fields of use.

General descriptions of the invention include a highly refined cellulose product comprising microfibers derived from organic fiber plant mass. A preferred highly refined cellulose would contain at least 50% by weight of all fiber mass as parenchymal fiber mass, the highly refined cellulose product having a high water retention capacity, by way of non-limiting examples, of at least about 25 g $H_2O$/g dry highly refined cellulose product. The highly refined cellulose product also may have a water retention capacity of at least 50 g $H_2O$/g dry highly refined cellulose product. A highly refined cellulose material when used in this patent is defined by a fiber material that has a total dietary fiber (TDF) content greater than 15%, or greater than 20%, or greater than 25% or greater than 30% as measured by AOAC 991.43 and a water holding capacity greater than three, four or five parts water per part fiber as measured by AACC 56-30, followed literally or with the modification of testing a 2.5 gram fiber sample instead of a 5 gram fiber sample, and is less than 50%, 75% or less than 90% soluble fiber. One example of a highly refined cellulose that fits within this definition is a product from Fiberstar, Inc. (Willmar, Minn.) called Imulsi-Fi™ citrus fibers or additive. There are three types of Imulsi-Fi™ products, and they include 1) Emulsi-Fi A40, which only contains dried orange pulp, 2) Imulsi-Fi™ B40 additive, which only contains dried orange pulp and guar gum (a hydrocolloid), and 3) Emulsi-Fi™ C40, which only contains dried orange pulp and xanthan gum (a hydrocolloid). 1) The dried orange pulp in the Emulsi-Fi™ additive products is derived from parenchyma cell wall material.

Parenchymal cell walls refer to the soft or succulent tissue, which is the most abundant cell wall type in edible plants. For instance, in sugar beets, the parenchyma cells are the most abundant tissue the surrounds the secondary vascular tissues (xylem and phloem). Parenchymal cell walls contain relatively thin cell walls compared to secondary cell walls are tied together by pectin (Haard and Chism, 1996, Food Chemistry. Ed. By Fennema. Marcel Dekker NY, N.Y.) In secondary cell walls (xylem and phloem tissues), the cell walls are much thicker than parenchymal cells and are linked together with lignin. This terminology is well understood in the art.

As used in the practice of the present invention, the term "dry" or "dry product" refers to a mass that contains less than 15% by weight of fibers as water. The organic fiber mass comprises at least 50% by weight of fiber mass from organic products selected from the group consisting of sugar beets, citrus fruit, grapes, tomatoes, chicory, potatoes, pineapple, apple, carrots and cranberries. A cosmetic product or cosmetic additive may have at least 0.05 percent by weight solids in the cosmetic product or cosmetic additive of the above described highly refined cellulose product. The cosmetic product may also have at least about one-half percent, one percent or at least about two percent by weight of the highly refined cellulosic fiber of the invention.

A method for refining cellulosic material may comprise: a) soaking raw material from organic fiber plant mass comprising at least 50% by weight of all fiber mass as parenchymal fiber mass in an aqueous solution with less than 1% NaOH; b) draining the raw material and allowing the raw material to sit for a sufficient period under conditions (including ambient conditions of room temperature and pressure as well as accelerated conditions) so that the fibers and cells are softened so that shearing can open up the fibers to at least 40%, at least 50%, at least 60%, or at least 70, 80, 90 or 95% of their theoretic potential. This will usually require more that 4 hours soaking to attain this range of their theoretic potential. It is preferred that this soaking is for more than 5 hours, and preferably for at least about 6 hours. This soaking time is critical to get the materials to fully soften. When such a low alkaline concentration is used in the soaking, without the set time, the materials do not completely soften and cannot be sheared/opened up to their full potential. This process produces soaked raw materials; and the process continues with refining the soaked raw material to produce refined material; and drying the soaked raw material.

The process may perform drying by many different commercial methods, although some display improved performance in the practice of the present invention. It is preferred that drying is performed, at least in part, by fluid bed drying or flash drying or a combination of the two. An alternative drying process or another associated drying step is performed at least in part by tray drying. For example, fluid bed drying may be performed by adding a first stream of organic fiber plant mass and a second stream of organic fiber plant mass into the drier, the first stream having a moisture content that is at least 10% less than the moisture content of the second stream or organic fiber plant mass. The use of greater differences in moisture content (e.g., at least 15%, at least 20%, at least 25%, at least 40%, at least 50% weight-to-weight water percent or weight-to-weight water-to-solid percent) is also within the scope of practice of the invention. In the drying method, the water may be extracted with an organic solvent prior to drying. In the two stream drying process, the second stream of organic fiber plant mass may have at least 25% water to solids content and the first stream may have less than 15% water to solids content. These processes may be practiced as batch or continuous processes. The method may use chopping and washing of the cellulose mass prior to soaking.

Another description of a useful process according to the invention may include draining and washing the soaked raw material in wash water to produce washed material; bleaching the washed material in hydrogen peroxide to produce a bleached material; and washing and filtering the bleached material to produce a filtered material.

The drying of an expanded fiber material according to the invention may use room temperature or higher air temperatures that dry the expanded fiber product and maintain the fiber material's functionalities of at least two characteristics of surface area, hydrogen bonding, water holding capacity and viscosity. This can be particularly performed with a method that uses a fluid bed dryer or flash dryer to dry the expanded or highly refined cellulosic fiber product.

The use of a flash or fluid bed dryer is an advantage over the drying methods suggested by the prior art. We have found that through the use of a fluid bed or flash dryer, low temperatures and controlled humidity are not needed to dry the materials of the present invention. In fact, although nearly any drying temperature in the fluid bed or flash dryer can be used, we have dried the product of the present invention using high air temperatures (400.degree. F.) and attained a dry product with near equivalent functional properties after rehydration compared to the materials before drying. Additionally, using the process of the present invention, any surface area expanded cellulosic product can be dried and a functional product obtained and is not limited to parenchyma cell wall materials. The use of a fluid bed or flash dryer, the use of relatively high drying air temperatures (400 F+), and the ability to dry non parenchyma cell wall (secondary cell) and obtain a functional product is in great contrast to the relatively low temperatures, e.g. 100 C (212 F) and dryer types taught by conventional methods to dry expanded parenchymal cell wall materials. Other methods are also less energy efficient and time efficient, such as freeze drying (Gu et al, 2001).—from (Gu, L., R Ruan, P. Chen, W. Wilcke, P. Addis. 2001. Structure Function Relationships of Highly Refined Cellulose. Transactions of the ASAE. Vol 44(6):1707-1712). Freeze drying is not an economically feasible drying operation for large volumes of expanded cell wall products.

The fiber products of the invention may be rehydrated or partially rehydrated so that the highly refined cellulose product is rehydrated to a level of less than 90 g $H_2O$/g fiber mass, 70 g $H_2O$/g fiber mass, 50 g $H_2O$/g fiber mass or rehydrated to a level of less than 30 g $H_2O$/g fiber mass or less than 20 g $H_2O$/g fiber mass. This rehydration process adjusts the functionalities of the product within a target range of at least one property selected from the group consisting of water holding capacity, oil holding capacity, and viscosity and may include the use of a high shear mixer to rapidly disperse organic fiber plant mass materials in a solution. Also the method may include rehydration with soaking of the dry materials in a solution with or without gentle agitation.

Preferred areas of use include a cosmetic product to which at least 1% by weight of the organic fiber product of the invention is present in the cosmetic product. The process may enhance the stability of a cosmetic product by adding at least 0.5% by weight or 1% by weight of the highly refined cellulose products defined herein to the cosmetic products, usually in a range of from 1% to 10% by weight of the organic fiber plant mass product to the cosmetic product prior to application and then applying the cosmetic product. This process may include increasing the storage stability of any lipophilic and/or aqueous-based cosmetic product comprising adding from 1% to 10% by weight of the highly refined organic fiber plant mass product to the cosmetic product.

The basic process of the invention may be generally described as providing novel and improved fiber waste by-product from citrus fruit pulp (not the wood and stem and leaves of the trees or plant, but from the fruit, both pulp and skin) or fiber from sugar beet, tomatoes, chicory, potatoes, pineapple, apple, cranberries, grapes, carrots and the like (also exclusive of the stems, and leaves). The provided fiber mass is then optionally soaked in water or aqueous solution (preferably in the absence of sufficient metal or metallic hydroxides e.g., KOH, CaOH, LiOH and NaOH) as would raised the pH to above 9.5, preferably in the complete absence of such hydroxides (definitely less than 3.0%, less than 1.0%, more often less than 0.9%, less than 0.7%, less than 0.5%, less than 0.3%, less than 0.1%). The soaked material is then drained and optionally washed with water. This is optionally followed by a bleaching step (any bleaching agent may be used, but mild bleaching agents that will not destroy the entire physical structure of the fiber material is to be used (with hydrogen peroxide a preferred example, as well as mild chlorine bleaches). It has also been found that the bleach step is optional, but that some products require less color content and require bleaching. The (optionally) bleached material is washed and filtered before optionally being subjected to a shredding machine, such as a plate refiner which shreds the material into micro fibers. The optionally soaked, bleached, and refined material is then optionally dispersed, and homogenized at high pressure to produce HRC gel.

The HRC dispersion of the present invention is a highly viscous, semi-translucent gel. HRC embodiments comprise dried powders that are redispersable in water to form gellike solutions. The functional characteristics of HRC are related to various properties, including water- and oil-retention capacity, average pore size, and surface area. These properties inherently relate to absorption characteristics, but the properties and benefits provided by the processes and products of the invention seem to relate to additional properties created in the practice of the invention.

The present invention also includes an aqueous HRC gel having a lignin concentration of about one to twenty percent (1 to 20%). The HRC products of the present invention exhibit a surprisingly high WRC in the range of about 20 to at least about 56 g $H_2O$/g dry HRC. This high WRC is at least as good as, and in some cases, better than the WRC of prior art products having lower or the same lignin concentrations. The HRC products exhibit some good properties for ORC (oil retention capacity).

A general starting point for a process according to the invention is to start with raw material of sufficiently small size to be processed in the initial apparatus (e.g., where soaking or washing is effected), such as a soaker or vat. The by-product may be provided directly as a result of prior processing (e.g., juice removal, sugar removal, betaine removal, or other processing that results in the fiber by-product. The process of the present invention may also begin when raw material is reduced in size (e.g., chopped, shredded, pulverized) into pieces less than or equal to about 10×5 cm or 5 cm×2 cm. Any conventional type of manual or automated size reduction apparatus (such as chopper, shredder, cutter, slicer, etc.) can be used, such as a knife or a larger commercially-sized chopper. The resulting sized raw material is then washed and drained, thus removing dirt and unwanted foreign materials. The washed and chopped raw material is then soaked. The bath is kept at a temperature of about 20 to 100° C. The temperature is maintained within this range in order to soften the material. In one embodiment, about 100 g of chopped raw material is soaked in a 2.5 liter bath within a temperature range of about 20 to 80° C. for 10 to 90 minutes.

The resulting soaked raw material is subjected to another washing and draining. This washing and additional washing and draining tend to be more meaningful for sugar beets, potatoes, carrots (and to some degree also tomatoes, chicory, apple, pineapple, cranberries, grapes, and the like) than for citrus material. This is because sugar beets, potatoes, carrots, growing on the ground rather than being supported in bushes and trees as are citrus products, tend to pick up more materials from the soil in which they grow. Sugar beets and carrots tend to have more persistent coloring materials (dyes, pigments, minerals, oxalates, etc.) and retained flavor that also are often desired to be removed depending upon their ultimate use. In one embodiment, the soaked raw material is washed with tap water. In one other embodiment, the material is drained. This is optionally followed by bleaching the material with hydrogen peroxide at concentrations of about one (1) to 20% (dry basis) peroxide. The bleaching step is not functionally necessary to effect the citrus and grape fiber conversion to highly refined cellulose. With respect to carrots and sugar beets, some chemical processing may be desirable, although this processing may be significantly less stressful on the fiber than the bleaching used on corn-based HRC products. From our experience, some chemical step is required for sugar beets, and bleaching is one option. Using alkaline pretreatment baths is another option. Acid treatment or another bleaching agent are other options.

The material is optionally bleached at about 20 to 100° C. for about five (5) to 200 min. The bleached material is then subjected to washing with water, followed by filtering with a screen. The screen can be any suitable size. In one embodiment, the screen has a mesh size of about 30 to 200 microns.

The filtered material containing solids can then be refined (e.g., in a plate refiner, stone mill, hammer mill, ball mill, or extruder). In one embodiment, the filtered material entering the refiner (e.g., a plate refiner) contains about four percent (4%) solids. In another embodiment, the refining can take place in the absence of water being added. The plate refiner effectively shreds the particles to create microfibers. The plate refiner, which is also called a disk mill, comprises a main body with two ridged steel plates for grinding materials. One plate, a refining plate, is rotated while a second plate remains stationary. The plates define grooves that aid in grinding. One plate refiner is manufactured by Sprout Waldron of Muncy, Pa. and is Model 12-ICP. This plate refiner has a 60 horsepower motor that operates at 1775 rpm.

Water may be fed into the refiner to assist in keeping the solids flowing without plugging. Water assists in preventing the refiner's plates from overheating, which causes materials in the refiner to burn. (This is a concern regardless of the type of grinding or shearing device used). The distance between the plates is adjustable on the refiner. To set refining plate distances, a numbered dial was affixed to the refining plate adjustment handle. The distance between the plates was measured with a micrometer, and the corresponding number on the dial was recorded. Several plate distances were evaluated and the setting number was recorded. A variety of flow consistencies were used in the refiner, which was adjusted by varying solids feed rate. The amount of water flowing through the refiner remained constant. Samples were sent through the refiner multiple times. In one embodiment the materials are passed one or more times through the plate refiner.

The microfibers may then be separated with a centrifuge to produce refined materials. The refined materials are then diluted in water until the solids content is about 0.5 to 37%. This material is then dispersed. In one embodiment, dispersing continues until a substantially uniform suspension is obtained, about 2 to 10 minutes. The uniform suspension reduces the likelihood of plugging.

The resulting dispersed refined materials, i.e., microparticles, may then be homogenized in any known high pressure homogenizer operating at a suitable pressure. In one embodiment, pressures greater than about 5,000 psi are used. The resulting highly refined cellulose (HRC) gel may display a lignin content of about 1 to 20% by weight, depending in part upon its original content.

The absence of use of a mild NaOH soaking before the refining step in the present invention prior to high pressure homogenization does not require the use of high temperature and high pressure cooking (high temperature means a temperature above 100° C. and high pressure means a pressure above 14 psi absolute). High temperature and high pressure cooking may be used, but to the disadvantage of both economics and output of the product. This novel process further avoids the need for either mild concentrations of NaOH or of highly concentrated NaOH and the associated undesirable environmental impact of discharging waste water containing any amount of NaOH and organic compounds. The process also avoids a need for an extensive recovery system. In one embodiment, the pH of the discharge stream in the present invention is only about 8 to 9 and may even approach 7. The method of the present invention has the further advantage of reducing water usage significantly over prior art processes, using only about one third to one-half the amount of water as is used in conventional processes to produce to produce excellent HRC gel and amounts All of the mechanical operations, refining, centrifuging, dispersing, and homogenizing could be viewed as optional, especially in the case of citrus pulp or other tree bearing fruit pulps. Additionally, other shearing operations can be used, such as an extruder, stone mill, ball mill, hammer mill, etc. For citrus pulp, the only processes that are needed to produce the expanded cell structure are to dry (using the novel drying process) and then properly hydrate the raw material prior to the expanding and shearing step of the process of the invention. This simple process could also be used in other raw material sources.

Hydration is a term that means reconstituting the dried fiber back to a hydrated state so that it has functionality similar to the pre-dried material. Hydration can be obtained using various means. For instance, hydration can occur instantly by placing the dry products in a solution followed by shearing the mixture. Examples of shearing devices are a high shear disperser, homogenizer, blender, ball mill, extruder, or stone mill. Another means to hydrate the dry materials is to put the dry product in a solution and mix the materials for a period of time using gentle or minimal agitation. Hydrating dry materials prior to use in a recipe can also be conducted on other insoluble fibrous materials to enhance their functionality.

The initial slurry of fibers/cells from the EPM products is difficult to dry. There is even disclosure in the art (e.g., U.S. Pat. Nos. 4,413,017 and 4,232,049) that slurries of such processed products cannot be easily dried without expensive and time consuming processes (such as freeze drying, extended flat bed drying, and the like). Freeze drying is effective, but is not economically and/or commercially desirable. Similarly, tray dryers may be used, but the length of time, labor and energy requirements make the process costly. The slurries of the citrus and/or beet by-products may be dried economically and effectively according to the following practices of the invention. Any type of convective drying method can be used, including a flash dryer, fluid bed dryer, spray dryer, etc. One example of a dryer that can be used is a fluid bed dryer, with dry material being added to the slurry to equilibrate the moisture content in the materials. It has been found that by adding 5:1 to 1:1 dry to wet materials within the fluid bed drier improves the air flow within the drier and the material may be effectively dried. In the absence of the combination of "dry" and "wet" materials, the slurry will tend to merely allow air to bubble through the mass, without effective drying and without a true fluid bed flow in the drier. The terms wet and dry are, of course, somewhat relative, but can be generally regarded as wet having at least (>40% water/<60% solid content] and dry material having less than 20% water/80% solid content). The amounts are not as critical as the impact that the proportional amounts of materials and their respective water contents have in enabling fluid flow within the fluid bed drier. These ranges are estimates. It is always possible to use "wet" material with lower moisture content, but that would have to have been obtained by an earlier drying or other water removal process. For purpose of economy, and not for enabling manufacture of HRC microfibers according to the present invention from citrus or beet by-product, it is more economical to use higher moisture content fiber mass as the wet material. After the mixture of wet and dry materials have been fluid bed dried (which can be done with air at a more moderate temperature than is needed with flat bed dryers (e.g., room temperature air with low RH may be used, as well as might heated air). A flash drier may also be used alternatively or in combination with a fluid bed drier to effect moisture reduction from the citrus or beet by-product prior to produce a functional dry product. It would be necessary, of course, to control the dwell time in the flash drier to effect the appropriate amount of moisture reduction and prevent burning. These steps may be provided by the primary or source manufacturer, or the product may be provided to an intermediate consumer who will perform this drying step to the specification of the process that is intended at that stage.

One aspect of the drying process is useful for the drying of any expanded cellulose products, especially for the drying of highly refined cellulose fibers and particles that have been extremely difficult or expensive to dry. Those products have been successfully dried primarily only with freeze drying as a commercially viable process. That process is both expensive and energy intense. A method according to the present invention for the drying of any expanded cellulose fiber or particle product comprises drying an expanded cellulose product by providing a first mass of expanded cellulose fiber product having a first moisture content as a weight of water per weight of fiber solids; providing a second mass of expanded cellulose fiber product having a second moisture content as a weight of water per weight of fiber solids, the second moisture content being at least 20% less than said first moisture content; combining said first mass of expanded cellulose fiber product and said second mass of expanded cellulose product to form a combined mass; drying said combined mass in a drying environment to form a dried combined mass. The method may have the dried combined mass dried to a moisture content of less than 20, less than 10, less than 8, less than 5 or less than $3H_2O/g$ fiber mass. The method, by way of non-limiting examples, may use drying environments selected from the group consisting of, flash driers, fluid bed driers and combinations thereof.

The rehydration and shearing (particularly high shearing at levels of at least 10,000 sec$^{-1}$, preferably at least 15,000 sec$^{-1}$, more often, greater than 20,000, greater than 30,000, greater than 40,000, and conveniently more than 50,000 sec$^{-1}$ (which is the actual shearing rate used in some of the examples) of the dry fiber product enables the resultant sheared fiber to retain more moisture and to retain moisture more strongly. It has been noted in the use of materials according to the practice of the invention that when the fiber products of the invention are rehydrated, the water activity level of rehydrated fiber is reduced in the fiber (and the fiber present in a further composition) as compared to free water that would be added to the further cosmetic composition. The high water absorbency and well dispersed nature of the product also lends itself to be an efficient thickening agent/suspending agent in cosmetics.

In another embodiment, the HRC products of the present invention possess a WRC and ORC that are at least as good as or even better than prior art products (including the Chen product) with regard to the water retention characteristics and the strength of that retention. This is true even though the products of the present invention may have a higher lignin concentration than products made using conventional processes and are dried. It is assumed that the lignin which is present has been substantially inactivated to a sufficient degree so that the undesirable clumping does not subsequently occur. Another reason for these improved properties may be due to a porous network structure that is present in the HRC products of the present invention, but is lost in prior art products due to high concentration soaking in NaOH, and which may be slightly reduced even with the mild NaOH solutions used by the Lundberg patents.

A number of unexpected properties and benefits have been provided by the highly refined cellulose microfiber product of the present invention derived from parenchymal cell material. These products are sometimes referred to herein as "exclusively parenchymal cell wall structures." This is indicative of the fact that the majority source of the material comes from the cell structures of the plants that are parenchymal cells. As noted earlier, the HRC microfibers of the invention are not produced by mild treatment of the leaves, stems, etc. of the plants (which are not only parenchymal cell wall structures, but have much more substantial cell structures). This does not mean that any source of citrus or beet cells and fibers used in the practice of the present invention must be purified to provide only the parenchymal cells. The relative presence of the more substantive cells from leaves and stems will cause approximately that relative proportion of cell or fiber material to remain as less effective material or even material that is not converted to HRC, but will act more in the nature of fill for the improved HRC microfibers of the present invention. It may be desirable in some circumstances to allow significant portions of the more substantive cells and fibers to remain or even to blend the HRC (citrus or beet parenchyma based) product of the present invention with HRC fibers of the prior art to obtain particularly desired properties intermediate those of the present invention and those of the prior art. In the primary manufacturing process of the invention (that is, the process wherein the cells that have essentially only parenchymal cell walls are converted to HRC microfibers or particles according to the mild treatment process of the present invention), the more substantive cells and fibers may be present in weight proportions of up to fifty percent (50%). It is preferred that lower concentrations of the more substantive fibers are present so as to better obtain the benefit of the properties of the HRC fibers of the present invention, so that proportions of cells having exclusively parenchymal cell walls in the batch or flow stream entering the refining process stream constitute at least 50%, at least 60%, at least 70%, at least 80%, at least 90%, at least 95%, at least 97%, at least 98%, at least 99% or preferable about 100% of the fibrous or cellular material added to the refining flow stream. The final fiber product should also contain approximately like proportions of the HRC product of the present invention with regard to other HRC additives or fiber additives.

Among the unexpected properties and benefits of the HRC materials of the present invention derived from the mild refinement of cells and fiber from citrus and beet by-product are the fact of the HRC fibers, the stability of HRC fibers from parenchymal cells, the high water retention properties, the strength of the water retention properties of the fibers, the ability of the HRC fibers to retain water (moisture) even when heated, the ability of the HRC fibers to retain water (moisture) on storage, and the ability of the HRC fibers to retain moisture in cosmetics products without promoting degradation, deterioration or spoilage of the cosmetic as compared to cosmetics with similar concentrations of moisture present in the product that is not bound by HRC fibers. The ability of the fiber materials of the present invention to retard moisture migration is also part of the benefit. This retarded water migration and water activity of water retained or absorbed by the fibers of the invention may be related to the previously discussed binding activity and binding strength of water by the fiber. As the moisture is retained away from other ingredients that are more subject to moisture-based deterioration, the materials of the invention provide significant benefits in this regard. The HRC fiber materials of the present invention provide other physical property modifying capabilities in the practice of the invention. For example, the fibers can provide thickening properties, assist in suspending or dispersing other materials within a composition, and the like. These properties are especially present in HRC fibers of the invention provided from sugar beets and citrus products.

The percentage of fiber in the final product that is desirable to provide identifiable benefits is as low as 0.001% or 0.05% or 0.1% of the total dry weight of the final product. The HRC fiber product of the invention may be used as from 0.05 to 50% by weight of the dry weight of the product, 0.5 to 40%, 1 to 40%, 1 to 30%, 1 to 25%, 1 to 20%, 1 to 15%, 1 to 10%, and 2 to 20% by weight of the dry weight of the final product.

An unexpected property is for the finished dried product to have a viscosity in a 1% solution of 1000-300,000 centipoise at 0.5 rpms when measured using a Brookfield LVDV++ viscometer (Middleboro, Mass.). An additional unexpected property is for the end processed product to have similar rheology curves as other common hydrocolloids, such as xanthan gum. The expanded fiber products of the invention are highly effective and environmentally safe viscosity enhancers.

Example 1

A dry flowable flavoring formulation would be made with 50.0 grams Citri-Fi™ additive as a fiber or particulate additive, 7.5 grams spearmint oil. The oil would be sprayed on the additive, which would then be tumbled in a ribbon mixer. The product would be non-et to the touch with light compression.

Example 2

A post-baking sprinkle additive would be formed with lotion formulation would be made with 50.0 grams Citri- Fi™ additive as a fiber or particulate additive, and 7.5 grams cinnamon oil. The ingredients would be stirred, and dried in a closed environment at room temperature to form a dry flowable powder with an average particle dimension of less than 1.0 mm. The powder may be sprinkled over biscuit mix, with or without combination with sugar.

The use of the high-content parenchymal wall products produces from fruit and vegetable matter with high-parenchymal wall content is particularly effective in this stabilizing performance.

Example 3

Flowability was measured by a small device made by ourselves whereby five grams of powders was put in the top box of the simple equipment and the trap door was closed. The trap door was then opened and the powder flowed downwards to form a heap. This method allowed for the measurement of the drained angle of repose (α) and the poured angle of repose (β), as shown in FIG. 1(B). drained angle of repose (α) was measured for comparison using protractor to obtain the angle. More free-flowing powders tend to have lower drained angles of repose.

FIG. 1 the Schematic representation of the flowability test equipment (A) and the flowability test (B). α: drained angle of repose and β: poured angle of repose. The top graph line is maltodextrin, the next highest graph line is Citri-Fi™ 125M40, the third highest graph line is Citri-Fi™ 100M40, and the lowest graph line is Citri-Fi™ 100M20.

Table 1 below shows the results of the drained angles of repose with the comparison of amorphous silica, gum Arabic and Citri-Fi with different concentration of oil. Since the poured angle of repose (β) measured by this method was similar for most of the powders, so we only analyze the results of α.

The results show the flowability of the samples changed and were less flowable and didn't fall in the flowability device when oil levels exceeded 25% oil using Citri-Fi 100M40. This compares to 125M40, which didn't flow when oil levels exceeded 20%.

2. With the use of a dropper, slowly add oil to powder while food processor is in motion.
3. Mix sample intermediately.
4. Place sample in a Whirl-Pak® bag.
5. Analyze flowability by the feel of the samples based off of a ten-point scale, i.e., 0 being perfectly dry and flowable and 10 being wet, sticky and non flowable.

The results show how the various sizes of Citri-Fi™ additive and levels of oil compare to a typical 96% maltodextrin and 4% oil sample. Compared to the control (96% maltodextrin & 4% oil), oil plating levels up to 25% had flowability levels similar or better vs maltodextrin with smaller particle sizes having improved flowability and the larger Citri-Fi™ additive particle sizes at 25% oil being slightly less flowable vs 4% oil and maltodextrin. A decrease in Citri-Fi™ additive's particle size also increased flowability with 100M20 ranking the most flowable vs 100FG (the largest particle size tested) being the least flowable. At 20% oil levels, all of the tests with Citri-Fi™ additive had improved flowability vs maltodextrin.

What is claimed:

1. A method of making a free-flowing, dry-feel particulate material having a number average mean particle size of less than 2 mm useful as an edible product for mammals, the particulate material comprising:
   a) a highly-refined cellulose fiber material having an open and porous structure, wherein the highly refined cellulose fiber material has a total dietary fiber content greater than 30% as measured by AOAC 991.43 and a water holding capacity greater than five parts water per part fiber as measured by AACC 56-30 and is less than 90% soluble fiber;
   b) the highly refined cellulose material having an essential oil-based material adsorbed and absorbed on its open and porous structure;
   c) the essential oil-based material consisting essentially of an essential oil or a flavor oil derived from plants;
   d) the essential oil-based material being safely ingestible by mammals, wherein the essential oil-based material

TABLE 1 the drained angle of repose with different ingredients and oil

| Sample | Citri-Fi 100M40 with 5% oil | Citri-Fi 100M40 with 10% oil | Citri-Fi 100M40 with 15% oil | Citri-Fi 100M40 with 20% oil | Citri-Fi 100M40 with 25% oil | Citri-Fi 100M40 with 30% oil | Citri-Fi 100M40 with 35% oil |
|---|---|---|---|---|---|---|---|
| Angle of α | 87° | 90° | 90° | Half fall | Half fall | Can't fall | Can't fall |

| Sample | Citri-Fi 125M40 with 0 oil | Citri-Fi 125M40 with 5% oil | Citri-Fi 125M40 with 10% oil | Citri-Fi 125M40 with 15% oil | Citri-Fi 125M40 with 20% oil | Citri-Fi 125M40 with 25% oil | Citri-Fi 125M40 with 30% oil |
|---|---|---|---|---|---|---|---|
| Angle of α | 85° | 85° | 90° | Half fall | Half fall | Can't fall | Can't fall |

Example 4

The objective of these experiments was to compare flowability by touch or feel between various particle sizes of Citri-Fi™ additive; namely 100FG, 100M40, and 100M20, which are ranked in order of largest to smallest, and maltodextrin (MALTRIN® M100, Grain Processing Corporation) when oil is introduced at various levels. A basic mixing procedure was used as indicated below:

Procedure:

1. Place powder in a Waring® commercial food processor.

is oxidized at least 5% less after 8 hours when adsorbed and/or absorbed by the highly refined cellulose than the essential oil-based material alone in air having a 21% by volume oxygen content, 50% relative humidity at 20° C. and 760 mm pressure;

wherein the method of making comprises:

dry-blending the highly refined cellulose fiber material with the essential oil-based material at a weight ratio of 100 parts highly refined cellulose fiber material to 10-25 parts essential oil-based material, thereby causing the essential oil-based material to adsorb and absorb on the highly refined cellulose fiber material and form the free-flowing, dry-feel particulate material.

2. The method of claim 1 wherein the essential oil is cinnamon oil.

3. The method of claim 1 wherein the essential oil is spearmint oil.

4. The method of claim 1 wherein the essential oil-based material consists essentially of the essential oil.

5. The method of claim 1 wherein there is no maltodextrin present during the dry-blending, and the free-flowing, dry-feel particulate material is free of maltodextrin.

6. The method of claim 1 wherein there is no surfactant present during the dry-blending, and the free-flowing, dry-feel particulate material is free of surfactant.

7. The method of claim 1 wherein there is no gum material present during the dry-blending, and the free-flowing, dry-feel particulate material is free of gum material.

8. The method of claim 1 wherein there is no maltodextrin, no surfactant, and no gum material present during the dry-blending, and the free-flowing, dry-feel particulate material is free of maltodextrin, surfactant, and gum.

9. A method of making a free-flowing, dry-feel particulate material having a number average mean particle size of less than 2 mm useful as an edible product for mammals, the particulate material comprising:
   a) a highly-refined cellulose fiber material having an open and porous structure, wherein the highly refined cellulose fiber material has a total dietary fiber content greater than 30% as measured by AOAC 991.43 and a water holding capacity greater than five parts water per part fiber as measured by AACC 56-30 and is less than 90% soluble fiber;
   b) the highly refined cellulose material having an essential oil-based material adsorbed and absorbed on its open and porous structure;
   c) the essential oil-based material consisting essentially of an essential oil or a flavor oil derived from plants;
   d) the essential oil-based material being safely ingestible by mammals, wherein the essential oil-based material is oxidized at least 5% less after 8 hours when adsorbed and/or absorbed by the highly refined cellulose than the essential oil-based material alone in air having a 21% by volume oxygen content, 50% relative humidity at 20° C. and 760 mm pressure;
wherein the method of making comprises:
   dry-blending the highly refined cellulose fiber material with the essential oil-based material at a weight ratio of 100 parts highly refined cellulose fiber material to 15-25 parts essential oil-based material, thereby causing the essential oil-based material to adsorb and absorb on the highly refined cellulose fiber material and form the free-flowing, dry-feel particulate material.

10. The method of claim 9 wherein the essential oil-based material consists essentially of the essential oil.

11. The method of claim 10 wherein the essential oil is spearmint oil.

12. The method of claim 10 wherein the essential oil is cinnamon oil.

13. The method of claim 9 wherein there is no maltodextrin present during the dry-blending, and the free-flowing, dry-feel particulate material is free of maltodextrin.

14. The method of claim 9 wherein there is no surfactant present during the dry-blending, and the free-flowing, dry-feel particulate material is free of surfactant.

15. The method of claim 9 wherein there is no gum material present during the dry-blending, and the free-flowing, dry-feel particulate material is free of gum material.

16. The method of claim 9 wherein there is no maltodextrin, no surfactant, and no gum material present during the dry-blending, and the free-flowing, dry-feel particulate material is free of maltodextrin, surfactant, and gum.

* * * * *